United States Patent
Böse et al.

(10) Patent No.: US 7,608,197 B2
(45) Date of Patent: Oct. 27, 2009

(54) MAGNETORHEOLOGICAL ELASTOMERS AND USE THEREOF

(75) Inventors: Holger Böse, Würzburg (DE); Rene Röder, Grossenlupnitz (DE)

(73) Assignee: Fraunhofer-Gesellschaft zur Forderung der Angewandten Forschung e.V., Munich (DE)

( * ) Notice: Subject to any disclaimer, the term of this patent is extended or adjusted under 35 U.S.C. 154(b) by 256 days.

(21) Appl. No.: 11/574,397

(22) PCT Filed: Aug. 25, 2005

(86) PCT No.: PCT/EP2005/009195

§ 371 (c)(1), (2), (4) Date: Apr. 9, 2007

(87) PCT Pub. No.: WO2006/024457

PCT Pub. Date: Mar. 9, 2006

(65) Prior Publication Data

US 2008/0318045 A1    Dec. 25, 2008

(30) Foreign Application Priority Data

Aug. 27, 2004   (DE) ................ 10 2004 041 649

(51) Int. Cl.
*H01F 1/44* (2006.01)
(52) U.S. Cl. .............. 252/62.54; 252/62.52
(58) Field of Classification Search ............. 252/62.52, 252/62.53, 62.54
See application file for complete search history.

(56) References Cited

U.S. PATENT DOCUMENTS

| | | | |
|---|---|---|---|
| 2,575,360 A | 11/1951 | Rabinow | |
| 2,938,183 A | 5/1960 | Dillon | |
| 3,426,666 A | 2/1969 | Lindquist et al. | |
| 3,855,691 A | 12/1974 | Deschamps et al. | |
| 5,019,537 A | 5/1991 | Kato et al. | |
| 5,525,249 A | 6/1996 | Kordonsky et al. | |
| 5,549,837 A | 8/1996 | Ginder et al. | |
| 5,578,238 A | 11/1996 | Weiss et al. | |
| 5,645,752 A | 7/1997 | Weiss et al. | |
| 5,667,715 A | 9/1997 | Foister | |
| 5,771,013 A | 6/1998 | Fey | |
| 5,900,184 A | 5/1999 | Weiss et al. | |

(Continued)

FOREIGN PATENT DOCUMENTS

CA        2059356        7/1992

(Continued)

OTHER PUBLICATIONS

Shen et al, "Experimental Research and Modeling of Magnestorheological Elastomer", Joun. Intell. Mater'l. Sys. and Struct. vol. 15, Jan. 2004, pp. 27-35.*

(Continued)

*Primary Examiner*—C. Melissa Koslow
(74) *Attorney, Agent, or Firm*—Leydig, Voit & Mayer, Ltd.

(57) ABSTRACT

The present invention relates to magnetorheological elastomers comprising at least one non-magnetizable elastomeric carrier medium and magnetizable particles contained therein and also to the use thereof. In the case of MREs of this type, the mechanical properties, such as the rigidity modulus, can be changed reversibly by an applied magnetic field.

17 Claims, 7 Drawing Sheets

U.S. PATENT DOCUMENTS

| | | | |
|---|---|---|---|
| 5,905,112 A | 5/1999 | Hellermann | |
| 5,971,835 A | 10/1999 | Kordonski et al. | |
| 5,985,168 A | 11/1999 | Phule | |
| 6,027,664 A | 2/2000 | Weiss et al. | |
| 6,132,633 A | 10/2000 | Carlson | |
| 6,203,717 B1 | 3/2001 | Munoz et al. | |
| 6,395,193 B1 | 5/2002 | Kintz et al. | |
| 6,399,193 B1 | 6/2002 | Ellison | |
| 6,451,219 B1 | 9/2002 | Iyengar et al. | |
| 6,592,772 B2 | 7/2003 | Foister et al. | |
| 6,599,439 B2 | 7/2003 | Iyengar et al. | |
| 6,610,404 B2 | 8/2003 | Starkovich et al. | |
| 7,354,528 B2 | 4/2008 | Cheng et al. | |
| 7,393,463 B2 | 7/2008 | Ulicny et al. | |
| 7,419,616 B2 | 9/2008 | Ulicny et al. | |
| 2002/0066881 A1 | 6/2002 | Koppe | |
| 2003/0035955 A1 | 2/2003 | Yadav | |
| 2004/0105980 A1 | 6/2004 | Sudarshan et al. | |
| 2004/0126565 A1 | 7/2004 | Naganathan et al. | |
| 2005/0116194 A1* | 6/2005 | Fuchs et al. | 252/62.54 |
| 2007/0210274 A1 | 9/2007 | Böse | |
| 2007/0252104 A1 | 11/2007 | Böse | |
| 2009/0039309 A1 | 2/2009 | Böse | |

FOREIGN PATENT DOCUMENTS

| | | |
|---|---|---|
| DE | 36 30 690 C2 | 5/1989 |
| DE | 40 30 780 A1 | 4/1991 |
| DE | 41 01 869 A1 | 7/1992 |
| DE | 38 90 400 C2 | 2/1994 |
| DE | 196 14 140 C1 | 5/1997 |
| DE | 196 13 194 A1 | 10/1997 |
| DE | 197 25 971 A1 | 12/1998 |
| DE | 100 24 439 A1 | 12/2001 |
| EP | 0 418 807 B1 | 2/1995 |
| EP | 0 784 163 A1 | 7/1997 |
| EP | 784163 * | 7/1997 |
| EP | 1 283 530 A2 | 2/2003 |
| EP | 1 283 531 A2 | 2/2003 |
| EP | 1 372 162 A1 | 12/2003 |
| WO | WO 93/21644 A1 | 10/1993 |
| WO | WO 94/10693 A1 | 5/1994 |
| WO | WO 94/10694 A1 | 5/1994 |
| WO | WO 01/61713 A1 | 8/2001 |
| WO | WO 01/84568 A2 | 11/2001 |
| WO | WO 02/45102 A1 | 6/2002 |
| WO | WO 03/021611 A1 | 3/2003 |
| WO | WO 03/025056 A1 | 3/2003 |

OTHER PUBLICATIONS

English translation of International Preliminary Report on Patentability for International Patent Application No. PCT/EP2005/009195.

"Proceedings of the 5th International Conference on Electro-Rheological Fluids, Magneto-Rheological Suspensions and Associated Technology", Sheffield, UK, Jun. 1995, Bullough, W.R. Ed., World Scientific Publishing Co. Pte. Ltd., Singapore (1995) pp. vii-xiii.

Chin et al., "Rheological Properties and Dispersion Stability of Magnetorheological (MR) Suspensions", Rheol Acta, 40: pp. 211-219 (2001).

Davis, L.C., "Model of Magnetorheological Elastomers", Journal of Applied Physics, 85(6): pp. 3348-3351 (1999).

Ginder et al., "Magnetorheological Elastomers: Properties and Applications", SPIE, 3675: pp. 131-138 (1999).

Jolly et al., "The Magnetoviscoelastic Response of Elastomer Composites Consisting of Ferrous Particles Embeddded in a Polymer Matrix", Journal of Intelligent Material Systems and Structures, vol. 7, pp. 613-622 (Nov. 1996).

Jolly et al., "A Model of the Behaviour of Magnetorheological Materials", Smart Mater. Struct., 5: pp. 607-614 (1996).

Jolly et al., "Properties and Applications of Commercial Magnetorheological Fluids", SPIE, vol. 3327, pp. 262-275 (1998).

Shen et al., "Experimental Research and Modeling of Magnetorheological Elastomers", Journal of Intelligent Material Systems and Structures, vol. 15, pp. 27-35 (Jan. 2004).

Florian, Zschunke, "Aktoren auf Basis des magnetorheologisten Effekts" [online], Jun. 20, 2005, p. 21, line 1-26, line 5.

* cited by examiner (a)  (b)  (c)

MAGNETORHEOLOGICAL ELASTOMERS AND USE THEREOF

This application is the U.S. National Phase of International Patent Application PCT/EP2005/009195, filed on Aug. 25, 2005, which claims priority to German Patent Application No. 10 2004 041 649.4, filed Aug. 27, 2004, all of which are hereby incorporated by reference.

The invention relates to magnetorheological elastomers comprising at least one non-magnetisable elastomeric carrier medium and magnetisable particles contained therein and also to the use thereof. In the case of MREs of this type, the mechanical properties, such as rigidity modulus, can be changed reversibly by an applied magnetic field.

Magnetically controllable elastomer composites comprising an elastomer matrix and magnetically polarisable particles, so-called magnetorheological elastomers (MREs), are already known. EP 41 88 07 B1 describes for example the production of a highly saturated nitrile rubber without binders and reaction promoters, in that strontium and/or barium ferrites are incorporated. According to the above-mentioned European Patent, the material is thereby hardened, after moulding, by the effect of a high voltage electron beam.

WO 230 25 056 A1 describes a resin composition comprising 50 to 95% by mass of an elastomer and also 50 to 5% by mass of an ethylene copolymer with high strength and good elastic properties. Magnetic powders are contained in this resin.

It is however disadvantageous with the MREs known to date in prior art that the mechanical properties of these already known MREs were adjustable only within limits by the applied magnetic field. As a result, the possibilities for using these MREs are limited.

Starting herefrom, it is therefore the object of the present invention to indicate new MREs which have particularly high variability by means of the applied magnetic field with respect to the mechanical properties. A further object of the invention is to reveal corresponding usage options for magnetorheological elastomers of this type.

The object is achieved by magnetorheological elastomers comprising at least one non-magnetisable elastomeric carrier medium and magnetisable particles contained therein, characterised in that the at least one elastomeric carrier medium is an elastomer which has a rigidity modulus <500 kPa measured at 10 Hz and a deformation of 1% as described herein. Such magnetorheological elastomers can be used as magnetically controllable elastomer composites together with a magnetic circuit, which contains electromagnets and permanent magnets for adjusting the operating point of the stiffness, or as magnetically controllable elastomer composition for vibration damping, vibration insulation, actuators, safety switches, haptic systems and artificial muscles.

According to the present invention, it is hence proposed that special elastomeric carrier media are used and in fact those which have a rigidity modulus<500 kPa measured at a frequency of 10 Hz and a deformation of 1% kPa, preferably <250 kPa. Hence increases in the rigidity modulus by the factor 100 or more can be achieved. The excellent properties of the magnetorheological elastomers according to the present invention are attributed to the fact that in particular "soft elastomeric carrier media" are used. The elastomers of the invention are polymers with elastomeric behaviour, which cannot flow in a viscous manner at the temperature of use because of the cross-linkage of the polymer chains (see also Römpp Chemie Lexicon, $1^{st}$ edition, page 1105 ff.). The elastomeric carrier media according to the invention, in addition to the above-described rigidity modulus, have a Shore hardness A of below 20, preferably below 10 and a modulus of elasticity<1500 kPa, preferably <750 kPa. The rigidity modulus of the elastomers according to the invention is determined by oscillation at a constant frequency and shear deformation. This hence concerns a material property of the elastomer.

It is suspected that the high increase of the rigidity modulus in the magnetic field can be attributed to the relatively high movability of the magnetic particles in the weakly cross-linked elastomer. It is hence achieved that the magnetic attraction forces between the particles overcome the holding forces produced by the elastomer so that the particles in the magnetic field can combine to form structures which are particularly strong mechanically. A special feature of the MREs according to the invention can be seen in the fact that, upon a reduction in the cross-linkage degree in the elastomer, the basic rigidity modulus in fact reduces as expected but the rigidity modulus in a strong magnetic field does however surprisingly increase partially.

In the case of the MREs according to the invention, it is preferred if the elastomer is selected from silicone or polyurethane, the corresponding rigidity modulus, as explained already initially, requiring to be present.

Elastomers which can be used for the MREs according to the invention are commercially available, e.g. from Bayer AG or Wacker-Chemie GmbH. The elastomers can thereby be produced such that, starting from the liquid educts, a thermal or photochemical cross-linkage is implemented, the educts for producing the elastomers being designed such that a corresponding cross-linkage degree and a corresponding rigidity modulus, as required according to the invention, is set.

Silicone elastomers are produced for example by polyaddition of long-chain, vinyl group-containing dimethylsiloxane polymers with short-chain, silane-containing dimethylsiloxane polymers. According to the position of the silane groups, the polymers are extended to form chains or cross-linked to form a three-dimensional network. By varying the silane proportion, the silicone elastomer produced during the cross-linkage can be adjusted in its cross-linkage degree and hence in its modulus values.

Polyurethane elastomers are synthesised for example by polyaddition of hydroxyl- with cyanate groups. The functionality of the cyanate- or hydroxyl reagents hereby determine the cross-linkage degree: bifunctional educts extend the molecule chains, trifunctional educts form three-dimensional cross-linkage points.

In the case of the magnetisable particles, all particles known per se from the prior art of MREs or for the magnetorheological fluids can be used. Those magnetisable particles comprising soft magnetic materials are preferred. Examples of these are: soft magnetic metallic materials, such as iron, cobalt, nickel (even in non-pure form) and alloys thereof, such as iron-cobalt, iron-nickel, magnetic steel, iron-silicon and/or mixtures thereof. Furthermore magnetisable particles comprising soft magnetic oxides ceramic materials can be used, such as garnets, perovskites and cubic ferrites of the general formula $MO.Fe_2O_3$ with one or more metals from the group M=Mn, Fe, Co, Ni, Cu, Zn, Ti, Cd or magnesium and mixtures thereof. Mixed ferrites such as MnZn-, NiZn-, NiCo-, NiCuCo-, NiMg-, CuMg-ferrites and/or mixtures thereof can also be used, such as also particles comprising iron carbide, iron nitride, alloys of vanadium, tungsten, copper and manganese and/or mixtures thereof. The preferred average particle size thereby is in the range of 5 nm to 10 mm, preferably between 10 nm and 1 mm. The particle size distribution can also be bimodal.

In the case of the magnetorheological elastomers according to the invention, the magnetisable particles can be distributed isotropically or anisotropically in the elastomer matrix.

An anisotropic arrangement is achieved in that a chain-like structure is imprinted along the field lines on the magnetisable particles already before and/or during the cross-linkage by applying a magnetic field. By means of the strength of the magnetic field prevailing before or during the cross-linkage, finenesses of the imprinted structure can be prescribed.

A uniform distribution of the particles in the elastomer matrix is achieved without applying a magnetic field by means of careful homogenisation.

The possibility of anisotropic or isotropic arrangement of the particles in the elastomer matrix has great significance for the MREs according to the invention. Hence the mechanical basic properties, but also the changes in mechanical properties, can be adjusted in addition by applying a magnetic field.

The magnetorheological elastomers according to the invention can of course also contain additives already known in prior art as dispersion agents, antioxidants, defoamers, softeners and/or friction-reducing agents.

A preferred composition of the MREs according to the invention is as follows:
the proportion of magnetisable particles is between 5 and 70% by volume, preferably between 10 and 60% by volume.
the proportion of the elastomeric carrier medium is between 20 and 95% by volume, preferably between 30 and 90% by volume.
proportion of additives is up to 20% by mass, preferably between 0.01 and 15% by mass, relative to the magnetisable solid materials.

The invention relates furthermore to the use of the magnetorheological materials.

It was established that, in the case of the MREs according to the invention, both the storage modulus (describes the elastic behaviour or energy storage) and the loss modulus (describes the viscous behaviour or energy dissipation) are influenced by the magnetic field. The same applies also to the loss factor as ratio of loss modulus and storage modulus. Hence technically important possibilities are produced for electrically controlled vibration damping or vibration insulation.

A special embodiment of the use of MREs of this type resides in the construction of a magnetic circuit with the inclusion of an electromagnet and a permanent magnet. By choosing a permanent magnet, an increased basic rigidity of the elastomer composite can be set. The electromagnet can strengthen or weaken the magnetic field according to the direction of the flowing current and hence either increase or reduce the rigidity of the elastomer composite (elasticity modulus or rigidity modulus). Hence for example the operaLing point in a vibration-damping system can be established. The MREs according to the invention can be used for a series of applications, such as e.g. for vibration damping, vibration suppression, actuators, safety switches, haptic systems and artificial muscles.

A further interesting property of the elastomer composite resides in the occurrence of a shape memory effect. In the magnetic field and hence in the stiffened state of the composite, an object which is moulded from the composite material can be changed in shape by the effect of external forces. The new shape is subsequently maintained as long as the magnetic field is in operation. After switching off the magnetic field, the object reverts to its original shape. This effect can be attributed to the fact that, in the magnetic field, the magnetic forces between the particles dominate, whereas the behaviour without a magnetic field is determined by the elastic forces of the elastomer. A prerequisite for this resides in the elastic forces not being too strong, A soft elastomer matrix is therefore particularly advantageous, the described behaviour can be used for example for safety systems or artificial muscles.

The invention is explained subsequently with reference to embodiments and the FIGS. 1 to 7.

EMBODIMENT 1

Figure 1:
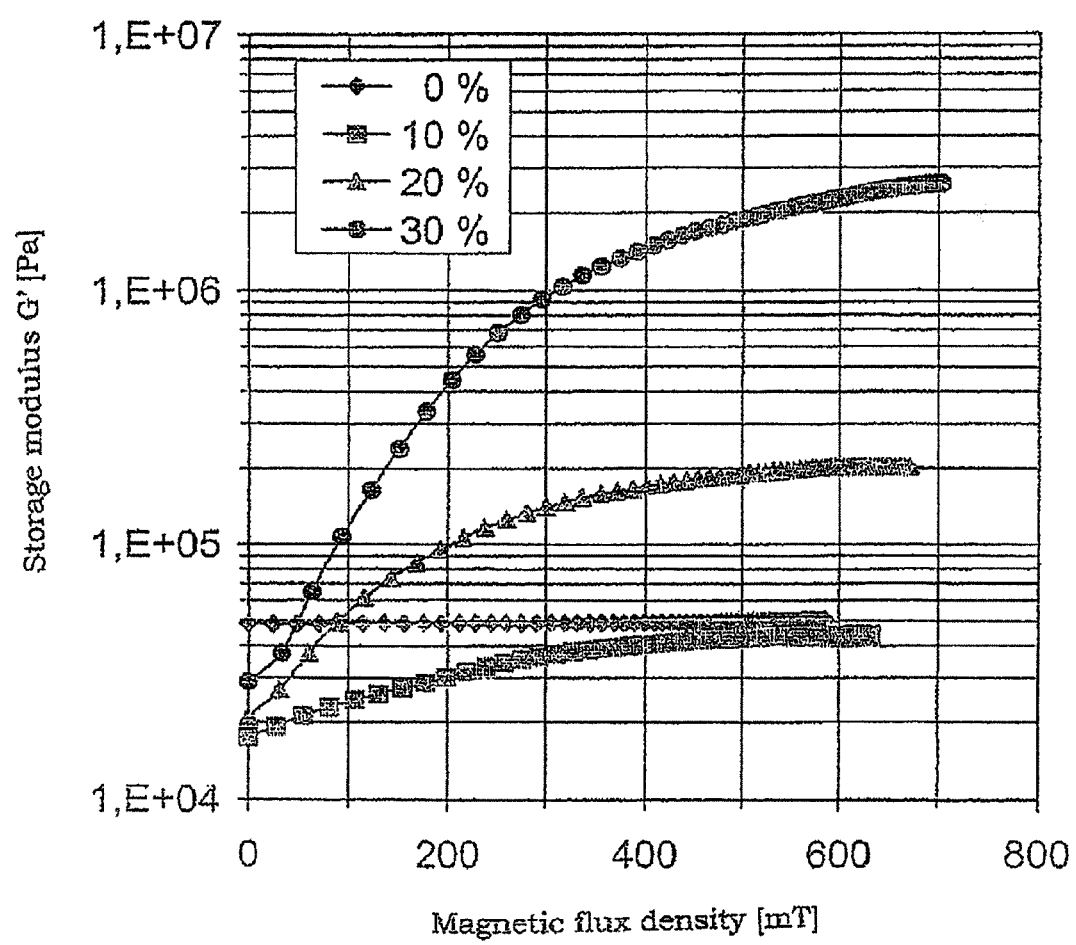
FIG. 1 is a graph depicting the increase in the storage modulus of magnetorheological elastomers with different contents of magnetisable particles in % by vol. (10, 20 or 30%) with increasing magnetic field strength and comparison with corresponding elastomer without magnetisable particles (0%), wherein the cross-linkage of the elastomer was effected without a magnetic field.

Silicone Elastomer with 10% by Volume of Iron Particles 45.8 g silicone polymer PTS-P 7000 N (α,ω-divinylpolydimethylsiloxane, viscosity 7000 mPas, density 0.975 g/cm$^3$ at 23° C., Wacker-Chemie GmbH) are weighed into an aluminium container with a 250 ml volume to 0.001 g weighing accuracy. To these there are added 0.5 g inhibitor PT 67 (density 0.97 g/cm$^3$ at 23° C., Wacker-Chemie GmbH) which are homogenised with constant agitation by means of a glass rod (diameter 10 mm). Subsequently 0.5 g cross-linking agent PTS-X 58 (density 0.98 g/cm³ at 23° C., Wacker-Chemie GmbH) are stirred in carefully until all the components are uniformly distributed. Thereafter 41.69 g iron powder (Höganäs ASC 300, average particle size 41 µm) are dispersed in slowly. With constant agitation, now 0.1 g catalyst EP (1,1,3,3-tetramethyl-1,3-divinylsiloxane platinum complex, density 0.96 g/cm³ at 23° C., Wacker-Chemie GmbH) are added. After careful homogenisation, the aluminium container is placed in a sufficiently large desiccator and evacuated for 5 minutes. Subsequently the mixture is poured slowly into sample shapes made of polytetrafluoroethylene with 20 mm diameter and 1 mm height and tempered for 2 hours at 120° C.

EMBODIMENT 2

Silicone Elastomer with 20% by Volume of Iron Particles

The production is effected analogously to embodiment 1, the quantity of iron powder being increased to 93.8 g.

EMBODIMENT 3

Silicone Elastomer with 23% by Volume of Iron Particles

The production is effected analogously to embodiment 1, the quantity of iron powder being increased to 160.8 g.

EMBODIMENT 4

Reference Sample Silicone Elastomer Without Iron Particles

The production is effected analogously to embodiment 1, the addition of iron powder being omitted.

EMBODIMENT 5

Silicone Elastomer with 10% by Volume of Iron Particles and Cross-Linkage in the Magnetic Field The production is effected analogously to embodiment 1, the cross-linkage of the silicone being effected in a magnetic field of strength 1.28 T.

EMBODIMENT 6

Silicone Elastomer with 20% by Volume of Iron Particles and Cross-Linkage in the Magnet Field The production is effected analogously to embodiment 2, the cross-linkage of the silicone being effected in a magnetic field of strength 1.28 T.

EMBODIMENT 7

Silicone Elastomer with 30% by Volume of Iron Particles and Cross-Linkage in the Magnetic Field The production is effected analogously to the embodiment 3, the cross-linkage of the silicone being effected in the magnetic field of strength 1.28 T.

EMBODIMENT 8

Reference Sample Silicone Elastomer Without Iron Particles and Cross-Linkage in the Magnetic Field The production is effected analogously to embodiment 4, the cross-linkage of the silicone being effected in a magnetic field of strength 1.28 T.

Implementation of the Measurements on the Magnetorheological Elastomers

The mechanical properties of the cross-linked magnetorheological elastomer samples were examined in a rotational rheometer MCR 300 by the company Paar-Physica in a magnetic field of variable strength.

The disc-shaped sample with 20 mm diameter is thereby situated between two parallel, horizontally disposed plates, the upper plate of which exerts a prescribed rotational vibration and hence subjects the sample to shear deformation by oscillation. The magnetic field penetrates the sample vertically, i.e. perpendicularly to the plate plane. The amplitude of the shear deformation was kept constant at 0.01 (corresponding to 1%). The frequency of the vibration was 10 Hz, the temperature was 25° C. During the measurement the current strength in the magnetic field-exciting coil was increased gradually and hence the magnetic field was increased.

During the measurement, apart from the shear deformation, also the shear stress and phase shift between both variables are picked up by the measuring apparatus. From the measuring variables, the storage modulus G' (real part of the complex rigidity modulus), the loss modulus G" (imaginary part of the complex rigidity modulus) and also the loss factor tan $\delta$=G"/G' are determined. The storage modulus describes the elastic behaviour of the material (storage of mechanical energy), whilst the loss modulus describes the viscous behaviour of the material (dissipation of mechanical energy and conversion into heat).

The measurement results are represented in FIGS. 1 to 7.

Figure 2:
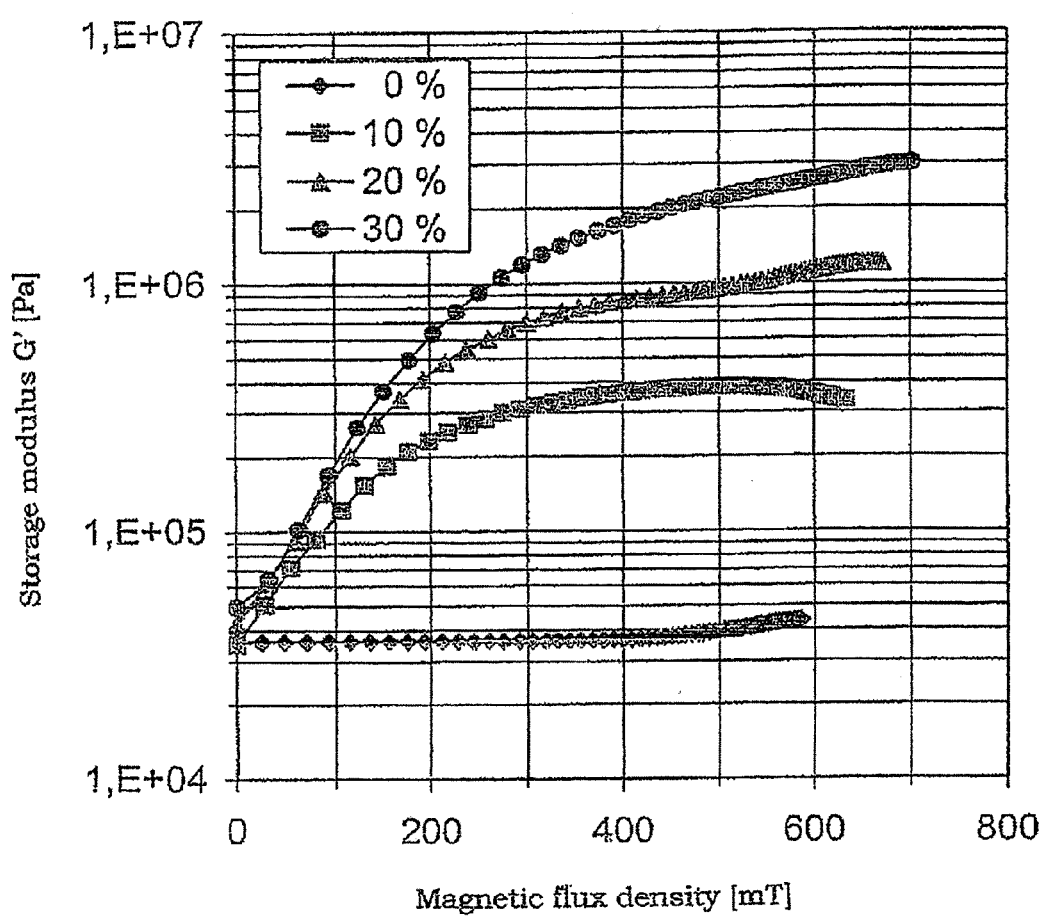
FIG. 2 is a graph depicting the increase in the storage modulus of magnetorheological elastomers with different contents of magnetisable particles in % by vol. (10, 20 or 30%) with increasing magnetic field strength and comparison with corresponding elastomer without magnetisable particles (0%), wherein the cross-linkage of the elastomer was effected in a magnetic field of 1.3T.
Figure 3:
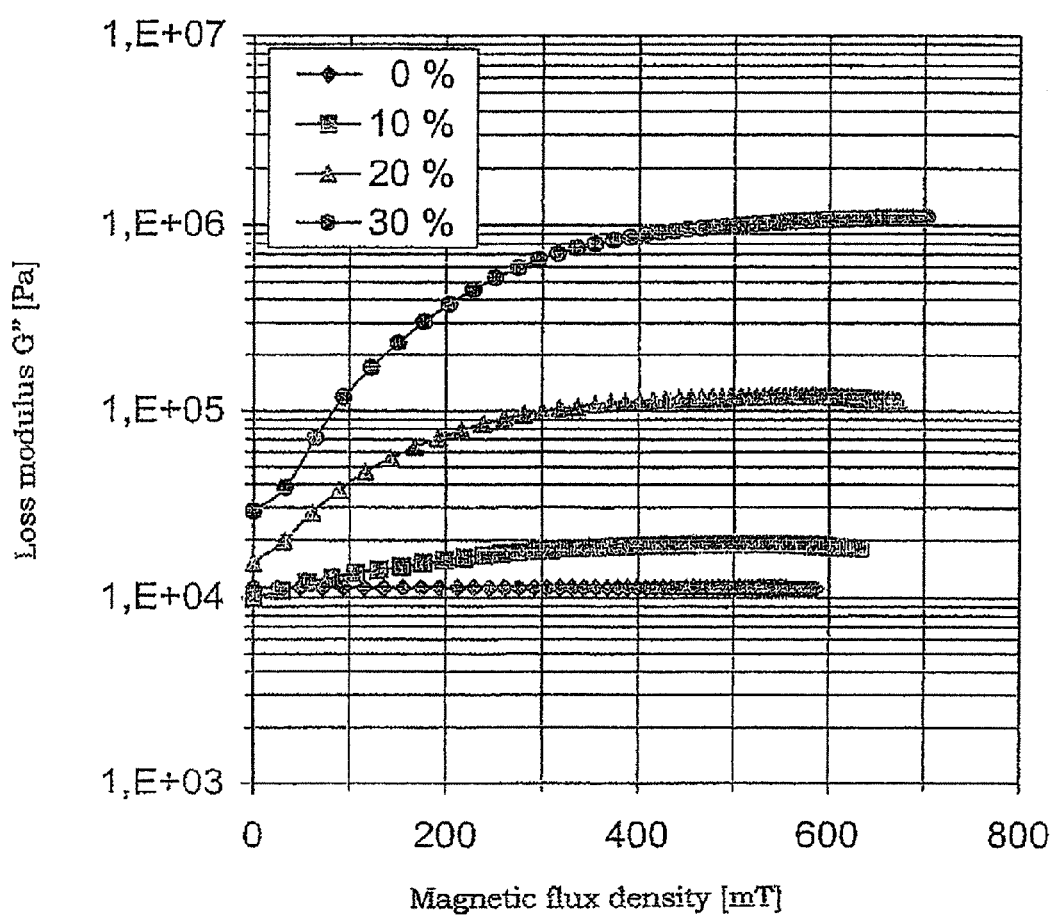
FIG. 3 is a graph depicting the increase in the loss modulus of magnetorheological elastomers with different contents of magnetisable particles in % by vol. (10, 20 or 30%) with increasing magnetic field strength and comparison with corresponding elastomer without magnetisable particles (0%), wherein the cross-linkage of the elastomer was effected without a magnetic field.
Figure 4:
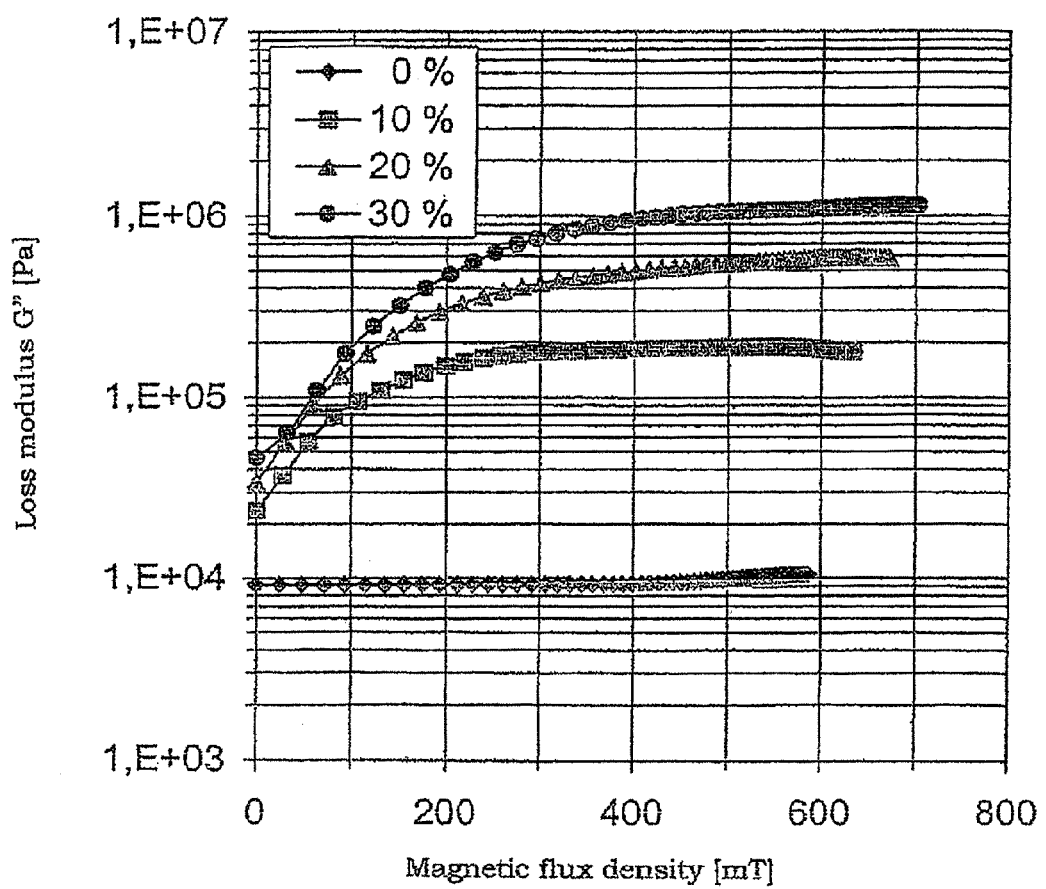
FIG. 4 is a graph depicting the increase in the loss modulus of magnetorheological elastomers with different contents of magnetisable particles in % by vol. (10, 20 or 30%) with increasing magnetic field strength and comparison with corresponding elastomer without magnetisable particles (0%), wherein the cross-linkage of the elastomer was effected in a magnetic field of 1.3T.
Figure 5:
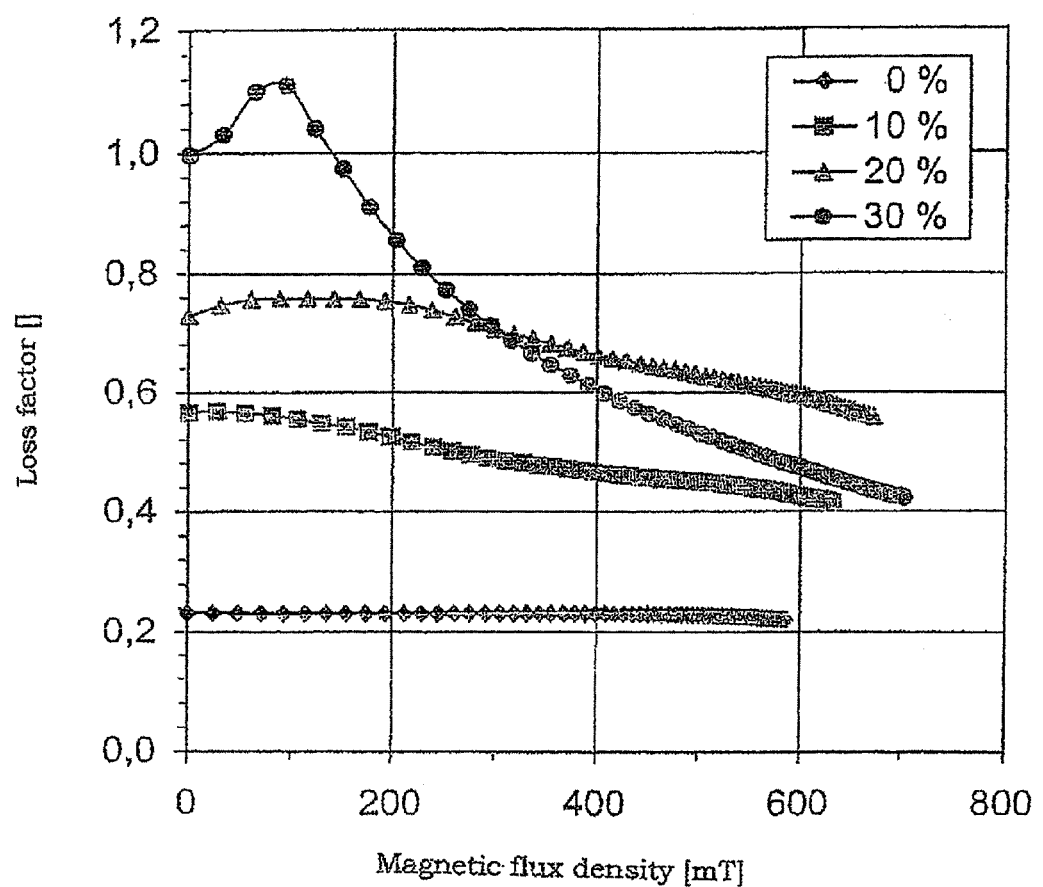
FIG. 5 is a graph depicting the change of the loss modulus of magnetorheological elastomers with different contents of magnetisable particles in % by vol. (10, 20 or 30%) with increasing magnetic field strength and comparison with corresponding elastomer without magnetisable particles (0%), wherein the cross-linkage of the elastomer was effected without a magnetic field.
Figure 6:
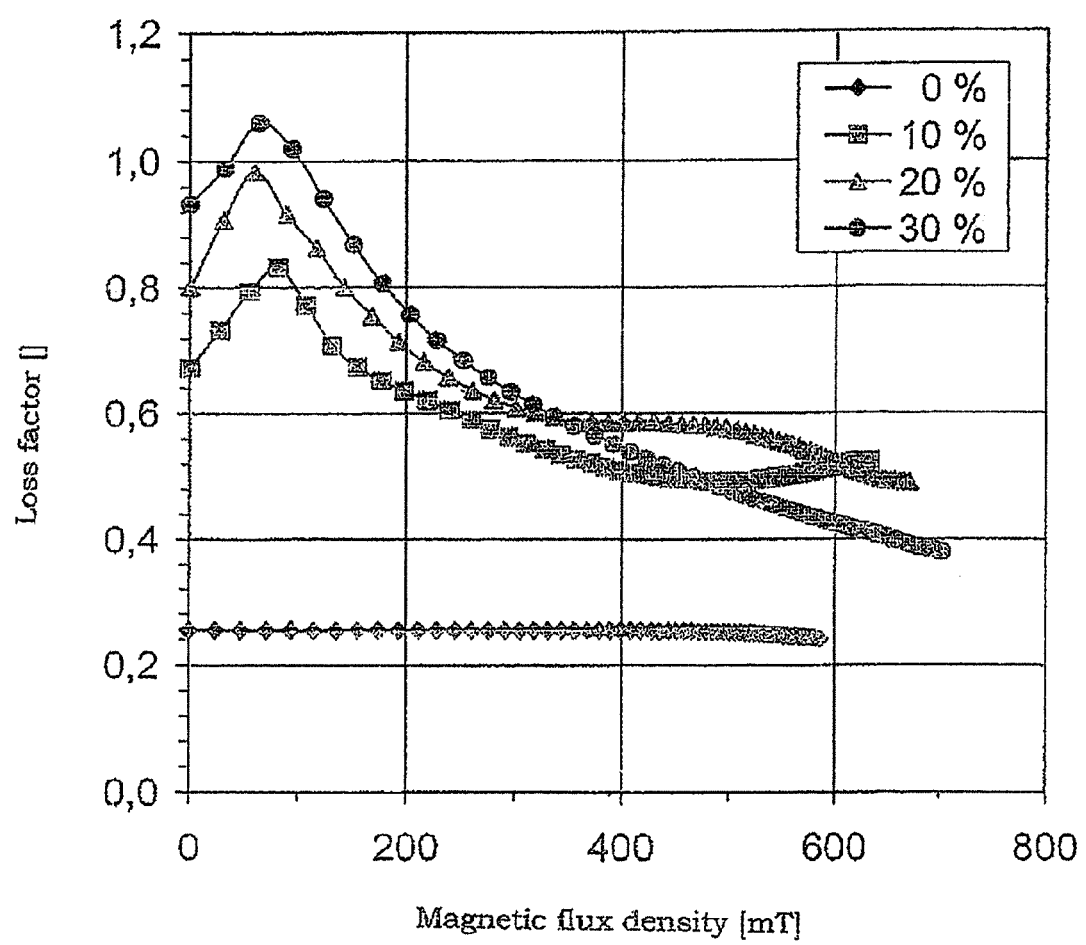
FIG. 6 is a graph depicting the change of the loss modulus of magnetorheological elastomers with different contents of magnetisable particles in % by vol. (10, 20 or 30%) with increasing magnetic field strength and comparison with corresponding elastomer without magnetisable particles (0%), wherein the cross-linkage of the elastomer was effected in a magnetic field of 1.3T.

The measurement results show that the mechanical properties of the magnetorheological elastomers can be changed by the magnetic field strength to an extent not known to date. The mechanical properties depend in addition upon the volume proportion of the iron particles in the elastomer and also upon the size distribution, shape and composition of the particles. A further influential factor is the magnetic field which is applied during the cross-linkage of the elastomer. In embodiment 3, the storage modulus is increased by a magnetic field being applied during the measurement with a flux density of 700 mT from an initial value of 30 kPa to a value of nearly 3 MPa, i.e. by a factor of nearly 100 (FIGS. 1 and 2). For the loss modulus, an increase of 30 kPa to approx. 1 MPa is achieved for this sample FIGS. 3 and 4).

The high change in the loss factor tan $\delta$ with the applied magnetic field strength (flux density) (FIGS. 5 and 6) shows that the relative proportion of dissipated energy can be controlled by the magnetic field. This could be interesting for controllable vibration dampers.

Figure 7:
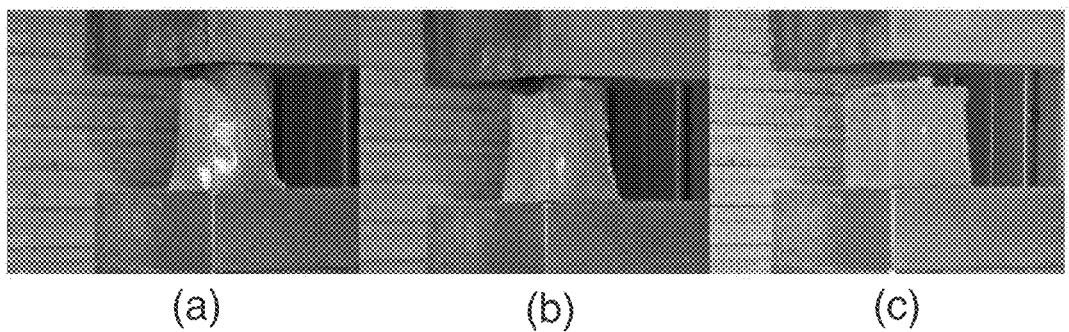
FIG. 7 is an image depicting the shape memory effect of MRE: in the magnetic field the MRE body (cube) which can be changed in shape and retains its new shape (a). Upon reduction (b) and switching off of the magnetic field (c) the MRE body reverts to its original cube shape.

A further surprising property of the magnetorheological elastomers according to the invention is their shape memory effect. After a moulded article of the magnetorheological elastomer (e.g. a cube) has been stiffened in a sufficiently strong magnetic field, it can be changed in shape by the effect of external forces. This changed shape is maintained as long as the magnetic field is operating. When the magnetic field strength is gradually reduced, the moulded article reverts finally again to its initial shape. This shape memory effect can be repeated many times (FIG. 7).

The invention claimed is:

1. A magnetorheological elastomer comprising at least one non-magnetisable elastomeric carrier medium and magnetisable particles contained therein, wherein the at least one elastomeric carrier medium is an elastomer selected from silicone and polyurethane which has a rigidity modulus<250 kPa measured at 10 Hz and a deformation of 1%.

2. A magnetorheological material according to claim 1, wherein the magnetisable particles are soft magnetic materials.

3. A magnetorheological elastomer according to claim 2, wherein the magnetisable particles are soft magnetic metallic materials.

4. A magnetorheological elastomer according to claim 2, wherein the magnetisable particles are soft magnetic oxide ceramic materials.

5. A magnetorheological elastomer according to claim 1, wherein the magnetisable particles are mixed ferrites.

6. A magnetorheological elastomer according to claim 1, wherein the magnetisable particles are selected from iron carbide, iron nitride, alloys of vanadium, tungsten, copper and manganese and mixtures thereof.

7. A magnetorheological elastomer according to claim 1, wherein the average particle size of the magnetisable particles is between 5 nm and 10 mm.

8. A magnetorheological elastomer according to claim 1, wherein the magnetisable particles have a bimodal size distribution.

9. A magnetorheological elastomer according to claim 1, wherein the magnetisable particles have an anisotropic distribution in the elastomer matrix.

10. A magnetorheological elastomer according to claim 1, wherein the magnetisable particles have an isotropic distribution in the elastomer matrix.

11. A magnetorheological elastomer according to claim 1, further containing additives selected from dispersion agents, antioxidants, defoamers, softeners friction-reducing agents, and a combination thereof.

12. A magnetorheological material claim 1, wherein
the magnetisable particles are present in an amount between 5 and 70% by volume;
the elastomeric carrier medium is present in an amount between 20 and 95% by volume;
the additives are present in an amount up to 20% by mass (relative to the magnetisable solid materials).

13. A magnetorheological material according to claim 1, wherein:
the magnetisable particles are present in an amount between 10 and 60% by volume;
the elastomeric carrier medium is present in an amount between 30 and 90% by volume; and
the additives are present in an amount between 0.01 and 15 (relative to the magnetisable solid materials).

14. A magnetorheological material according to claim 3, wherein the soft magnetic metallic materials are selected from iron, cobalt, nickel, alloys thereof, magnetic steel, iron-silicon, and a mixture thereof.

15. A magnetorheological material according to claim 4, wherein the soft magnetic oxide-ceramic material is selected from garnets, perovskites and cubic ferrites of the general formula $$MO.Fe_2O_3$$

with one or more metals from the group M=Mn, Fe, Co, Ni, Cu, Zn, Ti, Cd or magnesium and mixtures thereof.

16. A magnetorheological material according to claim 5, wherein the mixed ferrite is selected from MnZn-, NiZn-, NiCo-, NiCuCo-, NiMg-, CuMg-ferrites and mixtures thereof.

17. A magnetorheological material according to claim 7, wherein the average particle size of the magnetisable particles is between 10 nm and 1 mm.

* * * * *